(12) United States Patent
Sokondar et al.

(10) Patent No.: US 8,463,259 B2
(45) Date of Patent: Jun. 11, 2013

(54) SERVICING CELL DISCOVERY DURING OUT OF SERVICE

(75) Inventors: Eniko Sokondar, Richmond (GB); Gordon Peter Young, Warwickshire (GB); Andrew Farnsworth, Bromsgrove (GB)

(73) Assignee: Research In Motion Limited, Waterloo, Ontario (CA)

( * ) Notice: Subject to any disclaimer, the term of this patent is extended or adjusted under 35 U.S.C. 154(b) by 1003 days.

(21) Appl. No.: 12/112,762

(22) Filed: Apr. 30, 2008

(65) Prior Publication Data

US 2009/0275329 A1 Nov. 5, 2009

(51) Int. Cl.
*H04W 4/00* (2009.01)

(52) U.S. Cl.
USPC ........ 455/434; 455/445; 455/461; 455/161.1; 370/216; 379/221.08; 379/27.01

(58) Field of Classification Search
USPC ............. 455/445, 41.1, 436, 461, 67.11, 560, 455/411, 434, 161, 515, 575; 370/466, 331, 370/904, 401, 216; 379/221.08, 27.01
See application file for complete search history.

(56) References Cited

U.S. PATENT DOCUMENTS

| | | | | |
|---|---|---|---|---|
| 5,794,146 | A * | 8/1998 | Sevcik et al. .................. | 455/434 |
| 6,219,551 | B1 * | 4/2001 | Hentila et al. ................. | 455/445 |
| 6,978,138 | B2 * | 12/2005 | Japenga et al. ................ | 455/436 |
| 2001/0018342 | A1 * | 8/2001 | Vialen et al. .................. | 455/423 |
| 2001/0055969 | A1 * | 12/2001 | Bonta et al. ................... | 455/436 |
| 2002/0147024 | A1 * | 10/2002 | Wan .............................. | 455/515 |
| 2004/0082328 | A1 * | 4/2004 | Japenga et al. ................ | 455/436 |
| 2004/0235478 | A1 * | 11/2004 | Lindquist et al. ............. | 455/440 |
| 2005/0044130 | A1 * | 2/2005 | Sillasto et al. ................. | 709/200 |
| 2005/0054298 | A1 * | 3/2005 | Chen .......................... | 455/67.11 |
| 2006/0084443 | A1 * | 4/2006 | Yeo et al. ...................... | 455/449 |
| 2006/0089964 | A1 * | 4/2006 | Pandey et al. ................. | 709/203 |
| 2006/0264215 | A1 * | 11/2006 | Ekstedt et al. ............. | 455/435.2 |
| 2007/0004445 | A1 * | 1/2007 | Dorsey et al. ................. | 455/525 |
| 2007/0072651 | A1 * | 3/2007 | Suzuki et al. ............... | 455/569.2 |
| 2008/0064390 | A1 * | 3/2008 | Kim .............................. | 455/425 |
| 2008/0108346 | A1 * | 5/2008 | Umatt et al. ................ | 455/432.1 |
| 2009/0116378 | A1 * | 5/2009 | Jen ................................ | 370/216 |
| 2009/0156206 | A1 * | 6/2009 | Rathonyi et al. ............. | 455/434 |

FOREIGN PATENT DOCUMENTS

| | | | |
|---|---|---|---|
| EP | 1361768 A2 | * | 11/2003 |
| WO | 0163955 A1 | | 8/2001 |
| WO | 0199443 A1 | | 12/2001 |
| WO | 2007086679 A1 | | 8/2007 |

OTHER PUBLICATIONS

PCT International Preliminary Report on Patentability; PCT Application No. PCT/CA2009/000566; Nov. 2, 2010; 4 pgs.

(Continued)

*Primary Examiner* — Mahendra Patel
(74) *Attorney, Agent, or Firm* — Conley Rose, P.C.; J. Robert Brown, Jr.

(57) ABSTRACT

A user equipment is provided. The user equipment comprises a processor that, when the UE goes out of service area of a first cell, is configured to search for a suitable cell before the UE loses a connection to a network by checking for a suitable cell among cells proximate to the first cell, based on a timer before the UE loses the connection to the network.

16 Claims, 6 Drawing Sheets

OTHER PUBLICATIONS

Second European Examination Report; EP Application No. 08157519.3; Jun. 2, 2010; 6 pgs.

EP Search and Examination Report; EP Application No. EP08157519; Sep. 19, 2008; 9 pgs.

3GPP TS 25.331 V7.8.0; 3rd Generation Partnership Project; Technical Specification Group Radio Access Network; Radio Resource Control (RRC); Protocol Specification (Release 7); Mar. 2008; pp. 1-31 and 46-47.

PCT International Search Report; PCT Application No. PCT/CA2009/000566; Aug. 13, 2009; 4 pgs.

PCT Written Opinion of the International Searching Authority; PCT Application No. PCT/CA2009/000566; Aug. 13, 2009; 3 pgs.

3GPP TS 25.133 V8.2.0; 3rd Generation Partnership Project; Technical Specification Group Radio Access Network; Requirements for Support of Radio Resource Management (FDD); Release 8; Mar. 2008; 184 pgs.

European Examination Report; Application No. 08157519.3; Feb. 17, 2001; 5 pgs.

European Examination Report; Application No. 08157519.3; Oct. 19, 2011; 6 pages.

European Examination Report; Application No. 08157519.3; Jun. 13, 2012; 4 pages.

Canadian Office Action; Application No. 2,722,934; Jan. 14, 2013; 3 pages.

\* cited by examiner

SERVICING CELL DISCOVERY DURING OUT OF SERVICE

BACKGROUND

Easily transportable devices with wireless telecommunications capabilities, such as mobile telephones, personal digital assistants, handheld computers, and similar devices, will be referred to herein as wireless devices or user equipment (UE). The terms "wireless device" and "user equipment" (UE) may refer to a device and its associated Universal Integrated Circuit Card (UICC) that includes a Subscriber Identity Module (SIM) application, a Universal Subscriber Identity Module (USIM) application, or a Removable User identity Module (R-UIM) application or may refer to the device itself without such a card. A wireless device or UE might communicate with a second wireless device or UE, some other element in a telecommunications network, an automated computing device such as a server computer, or some other device, any of which can be referred to as a correspondent node.

A communications connection between a UE and a correspondent node might promote a voice call, a file transfer, or some other type of data exchange, any of which can be referred to as a call or a session. A UE can be considered to be in a connected state when the UE has a peer-to-peer connection to the network over which it may send and/or receive data. A UE can be considered to be in an idle state when the UE is turned on but it does not have a peer-to-peer connection to the network. Additionally, the term "call" or "session" might refer only to a connection over which data exchange is possible. The "call" or "session" is active when data is exchanged and it is inactive when no data is neither sent nor received.

As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment.

In traditional wireless telecommunications systems, transmission equipment in a base station transmits signals throughout a geographical region known as a cell. For LTE equipment, the region in which a UE can gain access to a telecommunications network might be referred to by a different name, such as a hot spot. As used herein, the term "cell" will be used to refer to any geographical region in which a UE can gain access to a telecommunications network, regardless of whether the UE is a traditional cellular device or an LTE device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a user equipment (UE) is provided. The UE comprises a component that, when the UE goes out of a service area of a first cell, is configured to search for a suitable cell before the UE loses a connection to a network by checking for a suitable cell among cells proximate to the first cell based on a time before the UE loses the connection to the network. For example, in an embodiment, the checking for a suitable cell among cells proximate to the first cell may be initiated based on determining the UE may lose connection in about three to about seven seconds or based on determining that one of a plurality of timers of the UE may expire in about three to about seven seconds. As used herein, the term "out of service area" is used in accordance with the definition of this term provided by 3GPP ($3^{rd}$ Generation Partnership Project) Technical Specification 25.133, which is incorporated herein in its entirety for all purposes. A proximate cell to the first cell might be one of the cells visited by the UE prior to the serving cell or one of the neighboring cells to the serving cell. For example, one way to obtain information about the neighboring cells is to read the information provided by the network. When, for example, the UE is in cell_DCH state—when a dedicated radio channel is allocated to the UE for communicating with the network—and the UE goes out of service area the UE might perceive this loss of coverage as a "radio link failure".

In another embodiment a method of discovering a serving cell is provided. The method comprises going out of a service area of a first cell, starting a Timer out of service timer and possible timer T314 and timer T315, and on expiry of T305 (periodical cell update timer) and detecting the out of service condition then starting the T307 timer. Prior to expiration of the Timer out of service timer or expiry of the T307 timer, checking for coverage from a cell proximate to the first cell, based on the Timer out of service timer. For example, in an embodiment, the checking for coverage from the cell proximate to the first cell may be initiated about three seconds to about seven seconds before the Timer out of service timer expires.

Figure 1:
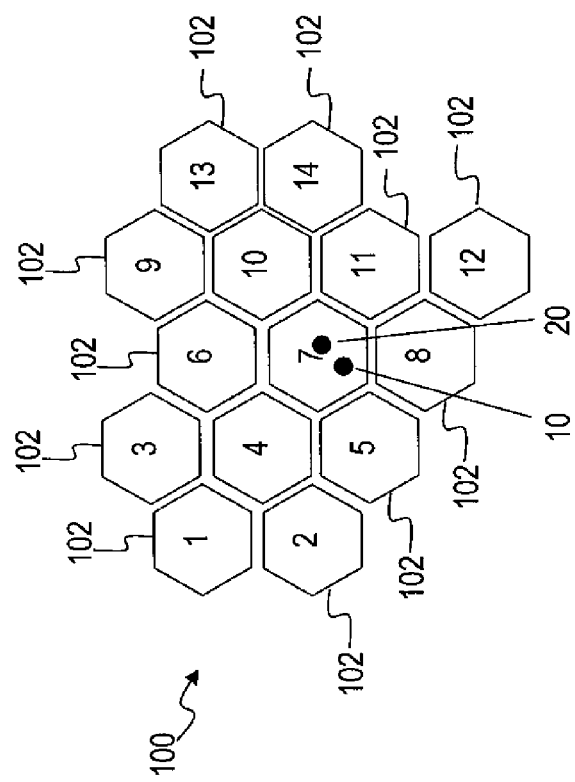
FIG. 1 is an illustration of a cellular network according to an embodiment of the disclosure.

Turning to FIG. 1, an exemplary network 100 according to an embodiment of the disclosure is illustrated. The network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represents a coverage area for providing telecommunications services in the network 100 through communication from a traditional base station, a node B, an enhanced node B (ENB), or some other radio access point. While the cells 102 are depicted as having non-overlapping coverage areas, persons of ordinary skill in the art will recognize that one or more of the cells 102 may have partially overlapping coverage with adjacent cells. Further, while a particular number of the cells 102 are depicted, persons of ordinary skill in the art will recognize that a larger or smaller number of the cells 102 may be included in the network 100.

One or more wireless devices or instances of user equipment (hereinafter UE 10) may be present in each of the cells 102. Although in FIG. 1 only one UE 10 is depicted and is shown in only one cell $102_7$, it will be apparent to one of skill in the art that a plurality of UE 10 might be present in each of the cells 102. An ENB, node B, base station, or similar component in each of the cells 102 provides a radio link between the UE 10 and other components in a telecommunications network. Hereinafter, any such component will be referred to as a node B 20 whether the component is a traditional base station, a node B, an enhanced node B (ENB), or some other radio access point. While the node B 20 is shown only in cell $102_7$, it should be understood that a node B 20 would be present in each of the cells 102. A central control 110 oversees the wireless data transmissions within the cells 102 by providing centralized management and coordination for the cells 102 and their corresponding node Bs 20. A node B 20 might have multiple cells 102. The central control 110 may be a mobility management entity (MME) or Radio Network Controller (RNC). Additional information regarding the e-UTRAN or UTRAN architecture may be found in $3^{rd}$ Generation Partnership Project (3GPP) Technical Specification (TS) 36.300 and TS 25.401 respectively, which is incorporated in herein by reference for all purposes.

Figure 2:
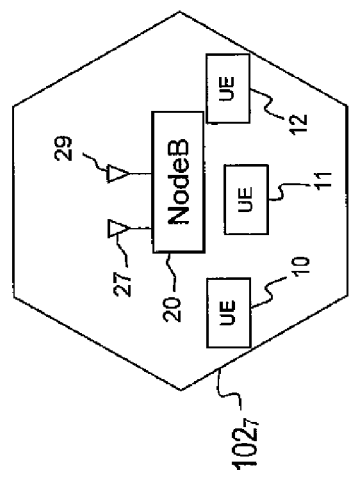
FIG. 2 is an illustration of a cell in a cellular network according to an embodiment of the disclosure.

In the present disclosure, the cellular systems or cells 102 are described as engaged in certain activities, such as transmitting signals; however, as will be readily apparent to one skilled in the art, these activities would in fact be conducted by components comprising the cells. As an example, FIG. 2 depicts a more detailed view of the cell $102_7$. The node B 20 in cell $102_7$ can promote communication via a transmitter 27, a receiver 29, and/or other well known equipment. Similar equipment might be present in the other cells 102. A plurality of wireless devices of the same type and function as UE 10 are present in the cell $102_7$, as might be the case in the other cells 102. In FIG. 2, instances of wireless devices or UE are depicted as UE 10, UE 11, UE 12.

The UE 10 may go out of service area and eventually lose its connection with its correspondent node, for example dropping an on-going call between the UE 10 and its correspondent node, due to causes resulting from actions by the UE 10, arising from circumstances beyond the control of the UE 10, or by a combination of these factors. The causes and circumstances surrounding the loss of coverage may also be temporary and/or long term. If the UE 10 is a mobile device, it may physically move to an area close to, immediately at or just beyond the border of the first cell $102_7$. Cells are not strictly defined geographic areas, but are rather areas covered by the ranging capability of a node B 20. The ranging capability of a node B 20 does not remain static from one day to the next or one hour to the next. The boundaries of a cell therefore are not strictly fixed, hence the overlapping of cell boundaries.

Instances may arise when a UE 10 will move to an area that may be temporarily beyond the ranging area of the first cell $102_7$ but not yet within the coverage area of an immediately adjacent cell $102_4$, $102_5$, $102_6$, $102_8$, $102_{10}$, and $102_{11}$. This loss of coverage may occur because the UE 10 moved, but it may be caused by a temporary shortfall in ranging capacity of the node B 20 of the first cell $102_7$. The node B 20 may experience a temporary shortfall of ranging capacity for reasons related to weather conditions, radio wave interference, or its own technical difficulties. The shortfall may be very temporary or may last for several minutes or longer. The UE 10 may experience temporary loss of coverage while moving through a radio shadow area or area of other radio propagation disturbance. In some contexts, when coverage is provided by more than one cell, for example during a soft handover, the term "the first cell $102_7$" and "out of service of the first cell $102_7$" may include the other cells involved in the soft handover.

While the UE 10 may be in a geographic area that under normal conditions is fully serviceable by the node B 20, the temporary loss of coverage for the UE 10 may be long enough such that it needs to locate alternate coverage. Under other circumstances, there may be no factors disrupting the coverage capability of the node B 20, but the UE may move to an area such as in a tunnel, in a confined area such as a concrete basement of a building, or inside a very crowded public area in which many parties are using electronic devices and radio interference occurs. These are circumstances in which the loss of coverage is due to the UE 10 and not the node B 20. While the disruption is temporary, it may be of a duration such that locating alternate coverage by the UE 10 is necessary. If the UE 10 does not move out of its present area or if the interference does not cease, connection with the correspondent node may be lost.

Loss of coverage by a UE 10 may be of a longer-term duration. If the UE 10 is a mobile device, it may move to a geographic area that is beyond the coverage area of the first cell $102_7$ and any other cells 102 under normal circumstances. The UE 10 may be carried in a motor vehicle that travels to a rural area which is beyond the range of any cellular coverage. The UE 10 may be carried in a boat that travels on a body of water far from shore and beyond all cellular coverage. Cell coverage may be lost by the UE 10 if carried on an airplane. Longer-term loss of cell coverage due to action by the UE 10 may arise from technical problems with the UE 10 such as battery weakness, circuit degradation or physical damage to the UE 10. Longer-term loss of coverage by the UE 10 may also be due circumstances beyond the control of the UE 10. The node B 20 could be struck by lightning and damaged such that it is out of service for an extended period. Other extended weather conditions may reduce or fully suspend the functionality of the node B 20. The node B 20 may suffer its own technical difficulties that cause an extended service reduction or outage.

When the UE 10 loses its coverage, whether or not due to its own actions, it must discover a serving cell to maintain its connection with a corresponding node with which it can regain service from the network with which it is communicating. The serving cell that is discovered may be different from the original cell or it might be the same cell that has again become available. Upon going out of service area, the UE 10 may not immediately lose its connection, but the communication link may no longer be transporting data signals. However, the UE 10 must discover a serving cell within a particular time duration or its connection may be lost. This may include attempts to reestablish connection with the first cell $102_7$, the cell with which the UE 10 was in connection with last before it lost coverage.

The UE 10 may employ a variety of techniques to discover a serving cell. When the UE 10 loses coverage under the 3GPP TS 25.331, a Timer out of service timer may begin with a default duration of thirty seconds. For further details about the Timer out of service timer, see 3GPP TS25.331 which is hereby incorporated by reference herein for all purposes. When loss of coverage is detected and the UE 10 enters the out of service condition a periodical update timer T305 may be running if the UE is in cell_FACH state. If this T305 timer expires at or during the UE being in this out of service condition another timer T307 is started. This timer T307 has a default time of thirty seconds but may be configured to be shorter or longer than this duration. For further details about T305 and T307, see 3GPP TS25.331 which is hereby incorporated by reference herein for all purposes.

When the UE 10 is in cell_DCH state and loses coverage (perceived as "radio link failure" by the UE) under the 3GPP TS 25.331, a T314 or a T315 timer may be started. For further details about the T314 timer and T315 timer, see 3GPP TS25.331 which is hereby incorporated by reference herein for all purposes. During the duration of the Timer out of service, T314 timer, T315 timer or T307 timer the UE 10 attempts to discover and re-enter cell coverage of the network the UE 10 is connected to. During and shortly before, for example about three to about seven seconds, the expiration of the Timer out of service, T314 timer, T315 timer or T307 timer, the UE 10 may check for coverage from the first cell $102_7$. The UE 10 may also check for a suitable cell from a different cell 102 but perhaps on the same frequency as the first cell $102_7$. The UE 10 may also check for a suitable cell among cells 102 adjacent or proximate the first cell $102_7$. In an embodiment the UE 10 may check for coverage with cells 102 that may be two or three cells remote from the first cell $102_7$. The UE 10 may also check for a suitable cell among cells 102 on the frequencies supported by the registered public land mobile network (PLMN) or among cells 102 on another radio access technology (RAT) supported by the registered public land mobile network. The UE 10 may also check for a suitable cell among ePLMN cells 102. The UE 10 may also check on all other frequencies and RATs supported by the UE for coverage of other PLMNs. It should be noted that the UE 10 does not necessarily check for a suitable cell among cells 102 in the order described above. The UE 10 may also perform the checks described above at other times, for example immediately after detecting that it is out of service area.

When the UE 10 is out of service area, one discovery strategy might be to search for a suitable cell among cells 102 on all possible frequencies supported by the UE 10. All possible frequencies may be referred to as a comprehensive set of frequencies or a comprehensive set of cell frequencies. If coverage from cells 102 on all possible frequencies is searched once, however, this process may for example take more than sixty seconds. In this circumstance, the connection between the UE 10 and the correspondent node could have long been lost. If the serving cell 102 coverage or a cell on the frequency on which the UE 10 was communicating fades and then subsequently returns, the time required to check all the possible other supported frequencies may result in dropping the connection with the correspondent node before searching again for this cell on this frequency, and discovering the return of the coverage by the cell 102. Since mobile radio channels are susceptible to rapid yet transient fades, repeatedly or periodically rechecking selected cells 102 for coverage may be a strategy of finding a suitable cell with a higher probability of success than a strategy based on exhaustively checking all frequencies, all RATs and all cells 102. To help return to service more quickly, the UE 10 may recheck for a suitable cell among cells 102 on the last used frequency more often. After checking for a suitable cell among cells 102 on a certain number (henceforth "N") of other frequencies, the UE 10 re-checks for coverage from cells 102 on the last used frequency. The UE 10 then checks for a serving cell 102 on N additional other frequencies and again rechecks for coverage from cells 102 on the last used frequency. The UE 10 repeats this until all supported frequencies have been checked. If a cell 102 on the last used frequency returns during the search, the UE 10 may greatly reduce the time taken to locate it. The cost of this practice may be that the overall search takes somewhat longer. The lower the value of N the higher the gain of quickly finding a first cell that may have come back into coverage, but the higher the cost in time to complete a full scan of all frequencies and RATs supported by the UE. Alternatively the UE 10 could recheck for coverage from cells 102 on the last used frequency based on an elapsed search time rather than N. In an embodiment, N may be about 50, but in other embodiment other values of N may be employed. For purposes of the present disclosure, checking for a serving cell 102 and checking for coverage from a cell 102 is substantially the same procedure.

This strategy may be generalized to interrupting a lengthy or complete search of all possible frequencies—the comprehensive set of supported frequencies—to repeatedly perform high probability searches or targeted searches for cell coverage. After completing the targeted search, the strategy resumes where it left off searching all possible frequencies. The targeted searches may be based on one or more of checking for a suitable cell from the first cell $102_7$, checking for a suitable cell from a cell proximate to the first cell $102_7$, checking for a suitable cell from a cell using the same frequency as the first cell $102_7$, checking for a suitable cell from a cell on one of a plurality of frequencies supported by the registered public land mobile network (RPLMN) or ePLMN (enhanced PLMN), checking for a suitable cell from a cell other than the first cell using a radio access technology (RAT) supported by the registered PLMN and different from the RAT used for the link with the first cell $102_7$. As used herein the terms "PLMN" and/or "RPLMN" shall be used to refer to both RPLMN and ePLMN.

Figure 3A:
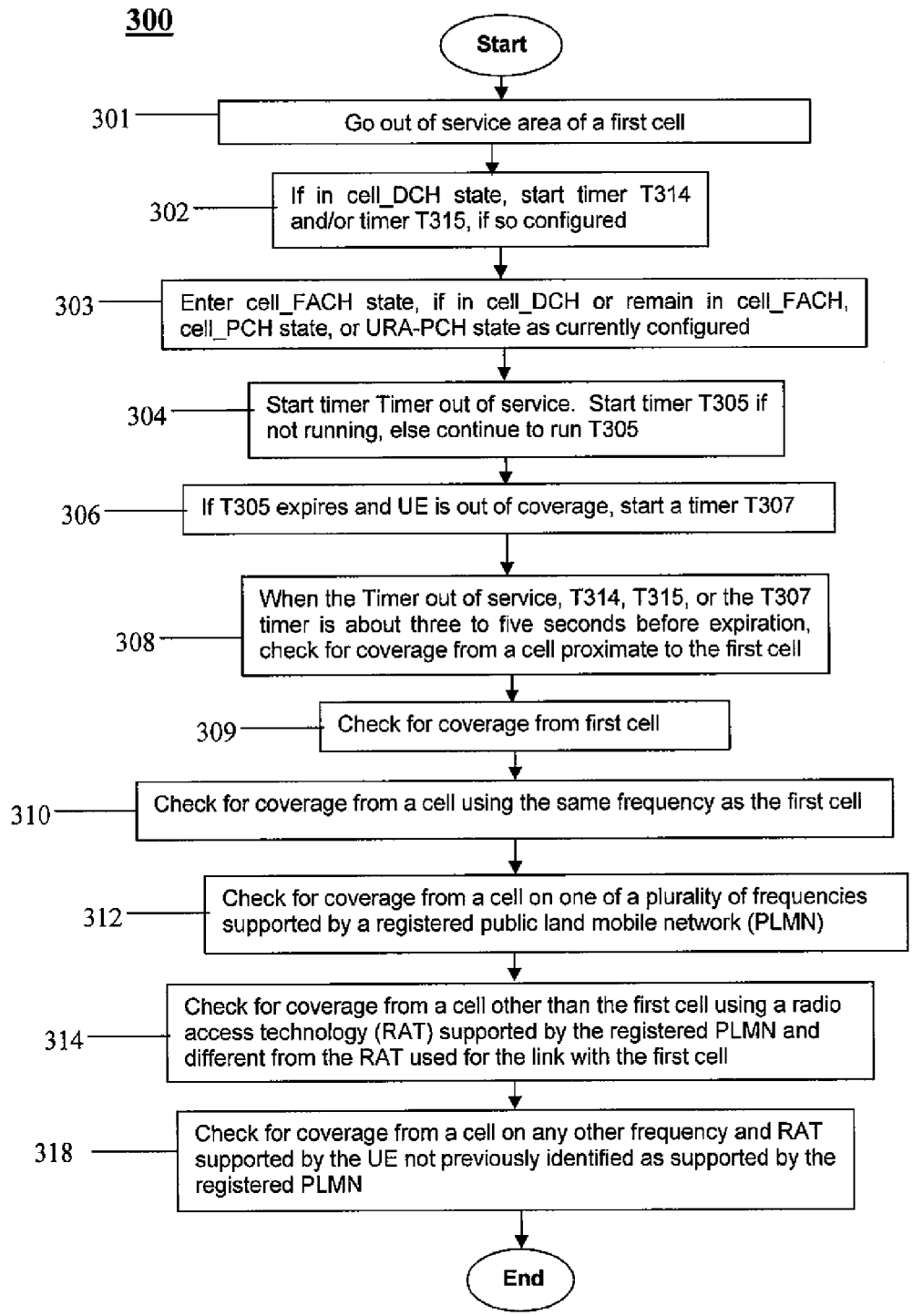
FIG. 3A is a flowchart of a method according to an embodiment of the disclosure.

Turning to FIG. 3A, a method 300 for discovery of a suitable cell during out of service area is described. In an embodiment described in the method 300, beginning at block 301, the UE 10 goes out of service area of a first cell, such as the first cell $102_7$. The UE 10 remains connected with the first cell $102_7$, but the UE 10 may be placed in a suspended state. In block 302, if the UE 10 is in cell_DCH state, a timer T314 and/or a timer T315 is started, depending on the configuration of the configuration of the UE 10 and/or the configuration of the network 100.

When the UE 10 detects that it has gone out of service area, perceived as a radio link failure if the UE is in cell_DCH state, of the first cell $102_7$ the UE 10, at block 303, enters to cell_FACH state if in cell_DCH at the time of going out of service area or remains in cell_FACH state, cell_PCH state, and URA_PCH state if already in one of these states. Additional information on the cell_DCH state, cell_FACH state, cell_PCH state, and URA_PCH state may be found in the 3GPP TS 25.331. In cell_FACH state, cell_PCH state, and URA_PCH state, UE 10 has a limited duration of time to discover service before the UE 10 either connects to an alternative network or enters idle mode and is disconnected from its corresponding node and registered network. At block 304, UE 10 starts timer T305 if not running, else continue to run timer T305. The UE 10 also starts timer Timer out of service. At block 306, the UE 10 starts timer T307 if timer T305 expires and it detects that it is still out of service area. Also the UE 10 may start timer T314 and timer T315 if the UE 10 is cell_DCH state during which the UE 10 attempts to discover a serving cell 102. At block 308, when whichever timer is the nearest to expiry, that is actually running, from the timers Timer out of service, timer T314 timer T315 or timer T307, is about three to about seven seconds before expiration, the UE 10 may check for a suitable cell among cells 102 proximate to the first cell 102$_7$. At block 309, the UE 10 checks for coverage from first cell 102$_7$. At block 310, the UE 10 checks for a suitable cell among cells using the same frequency as the first cell 102$_7$. At block 312, the UE 10 checks for a suitable cell among cells on one of a plurality of frequencies supported by a registered public land mobile network (RPLMN) or equivalent (e) PLMN. At block 314, the UE 10 checks for a suitable cell among cells using a radio access technology (RAT) supported by the registered PLMN. At block 318, the UE 10 checks for a suitable cell among cells on any other frequency and RAT supported by the UE 10 not previously identified as supported by the registered PLMN or ePLMN and the method 300 ends. At any time, if the UE 10 finds a suitable cell 102 that can act as a serving cell, the UE 10 may exit the method 300 at that point.

In an embodiment, blocks 308 through 318 of the method 300 may be performed not just about three seconds to about seven seconds before expiration of the Timer out of service, T314 timer, T315 timer and T307 timer but periodically, for example, about twenty-five seconds before expiration of the Timer out of service, T314 timer, T315 timer and T307 timer and again about fifteen seconds before expiration of the Timer out of service and T307 timer. In other embodiments, different repetition periods may be employed. In an embodiment, the blocks 309 through 314 may be repeated after every N frequencies checked in block 318, where N is some positive integer. In an embodiment, N may be about 50, but in other embodiments other values of N may be employed. In an embodiment, N may be about 10, about 20, about 100, or some other suitable number of frequencies checked in block 318 that may be readily determined, in combination with the present disclosure, by one skilled in the art. In an embodiment, the blocks 309 through 314 may be repeated after a predefined duration of time checking frequencies. In an embodiment, the processing of blocks 309 through 318 may also be performed before block 308, for example sometime after block 301. In an embodiment, one or more of the checks from blocks 309 through 318, rather than all of the blocks, may be performed. Various other combinations of checking and rechecking at varying intervals or orders the different components, such as frequencies, RATs, cells, and so on, in order to increase the likelihood of establishing or reestablishing lost communication before expiration of the timer will readily suggest themselves to one skilled in the art and are within the spirit and scope of the present disclosure.

Figure 3B:
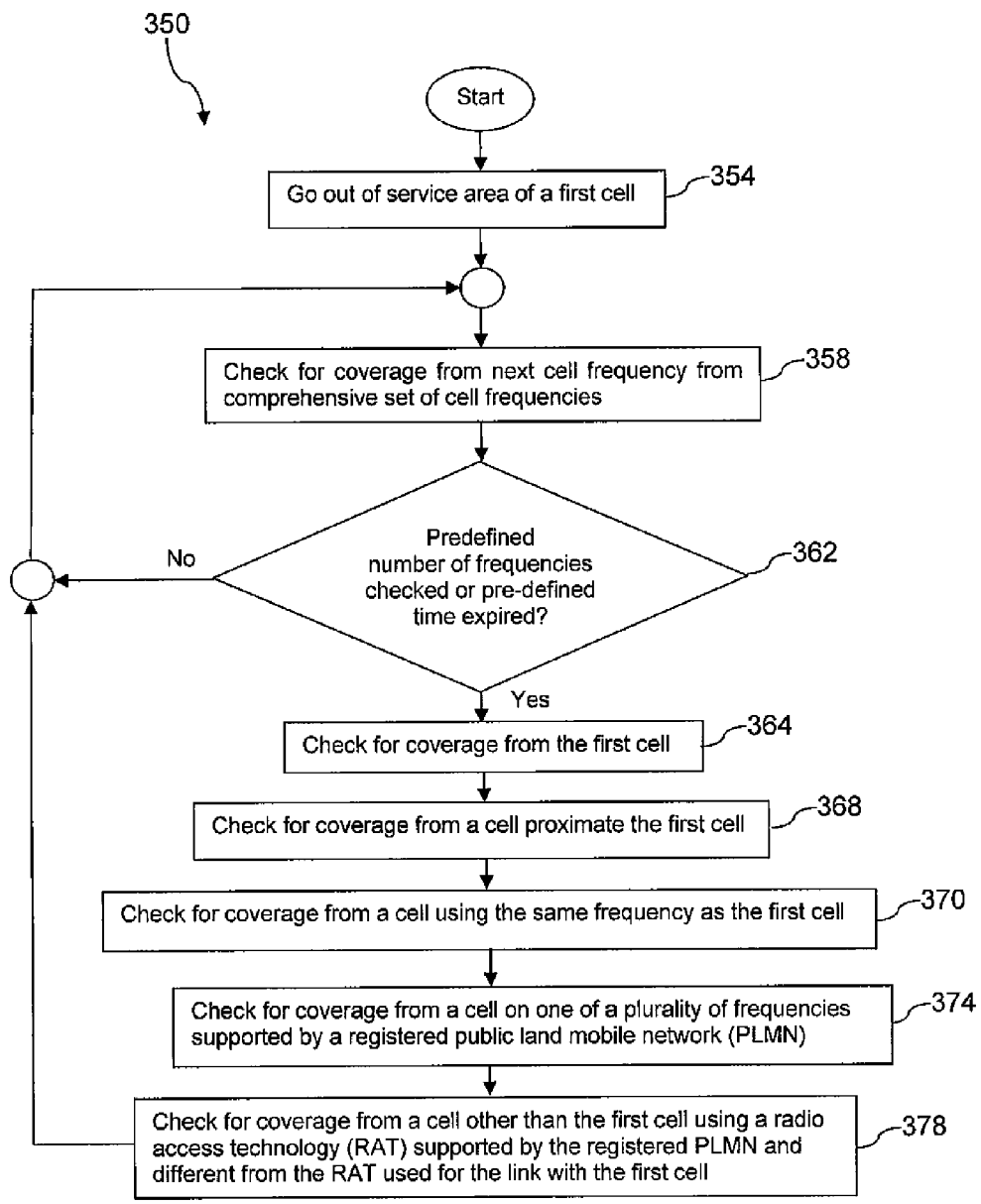
FIG. 3B is a flowchart of another method according to an embodiment of the disclosure.

Turning now to FIG. 3B, a method 350 for discovery of a serving cell during out of service area is discussed. In block 354, the UE 10 goes out of service area of a serving cell, such as the first cell 102$_7$. In block 358, the UE 10 initiates checks for a suitable cell on a frequency selected from a comprehensive set of possible cell frequencies. The comprehensive set of possible frequencies may be a complete list of all frequencies or a limited set of all frequencies that the UE 10 may feasibly check among for a suitable cell. It is contemplated that this comprehensive set of possible frequencies may be very large and that systematically checking a suitable cell among each of these frequencies may consume a substantial amount of time, perhaps more time than is available to restore coverage before losing the connection with the RPLMN.

In block 362, if the number of frequencies from the comprehensive set of possible cell frequencies checked reaches or exceeds a predefined number, for example an integer number N, the method 350 proceeds to block 364, otherwise the method 350 returns to block 358. Alternatively, the decision in block 362 can be based on checking for a suitable cell among the frequencies in the comprehensive set of frequencies for a predefined duration of time. In an embodiment, the predefined integer number may be about 50, but in other embodiments, other values for the predefined integer number may be employed. In an embodiment, the predefined integer number may be 10, 20, 100, or some other suitable integer number. In an embodiment, the predefined duration of time may be about 10 seconds, but in other embodiments other suitable predefined time durations may be employed. By looping between blocks 358 and 362, each of the predefined number of different frequencies from the comprehensive set of possible frequencies are checked for coverage from a suitable cell. In an embodiment, some loop variable may be established to count the number of iterations or repetitions of the loop 358, 362 and the decision block 362 may include comparing the incrementing value of the loop variable with the predefined number, for example N. When the processing passes on to block 364, the loop variable may be reset to zero or to one or to some other suitable value, depending upon the implementation of the looping and decision steps. In an embodiment, a pointer or other reference into the comprehensive set of possible frequencies may be maintained and advanced after each execution of block 358, whereby the process 350 steps systematically through the comprehensive set of possible frequencies.

At block 364, the UE 10 may check for coverage from the first cell 102$_7$. At block 368, the UE 10 may check for coverage from a suitable cell proximate the first cell 102$_7$. At block 370, the UE 10 may check for coverage from a suitable cell among cells using the same frequency as the first cell 102$_7$. At block 374, the UE 10 may check for coverage from a suitable cell from among cells on one of a plurality of frequencies supported by the registered public land mobile network (RPLMN).

In different embodiments, one of or a selection of the blocks 364, 368, 370, 374, and 378 may be performed rather than each of the blocks during one iteration through the blocks 358-378. In an embodiment, some pattern of alternating selection from the blocks 364, 368, 370, 374 and 378 may be used as the process 350 repeatedly iterates through the blocks 358-378. After performing those blocks selected for performing, the process 350 returns to block 358. The process 350 again loops through the blocks 358, 362 a predefined number of times, for example N times, checking for coverage from a predefined number of frequencies selected from the comprehensive set of possible frequencies. Alternatively, the process 350 loops through the blocks 358, 362 for a predefined time duration checking for coverage from a suitable cell among the comprehensive set of possible frequencies. The effect of the method 350 is that the UE 10 begins a systematic check for a suitable cell among each of the possible frequencies which is interrupted regularly to repeatedly perform a high value, non-random search or a targeted search for coverage from specific cells, frequencies or RATs associated with a higher expectation of success than the systematic search of all possible frequencies or RATs supported by the UE. When the UE 10 finds a suitable cell, the process 350 may exit the loop and stop processing.

Figure 4:
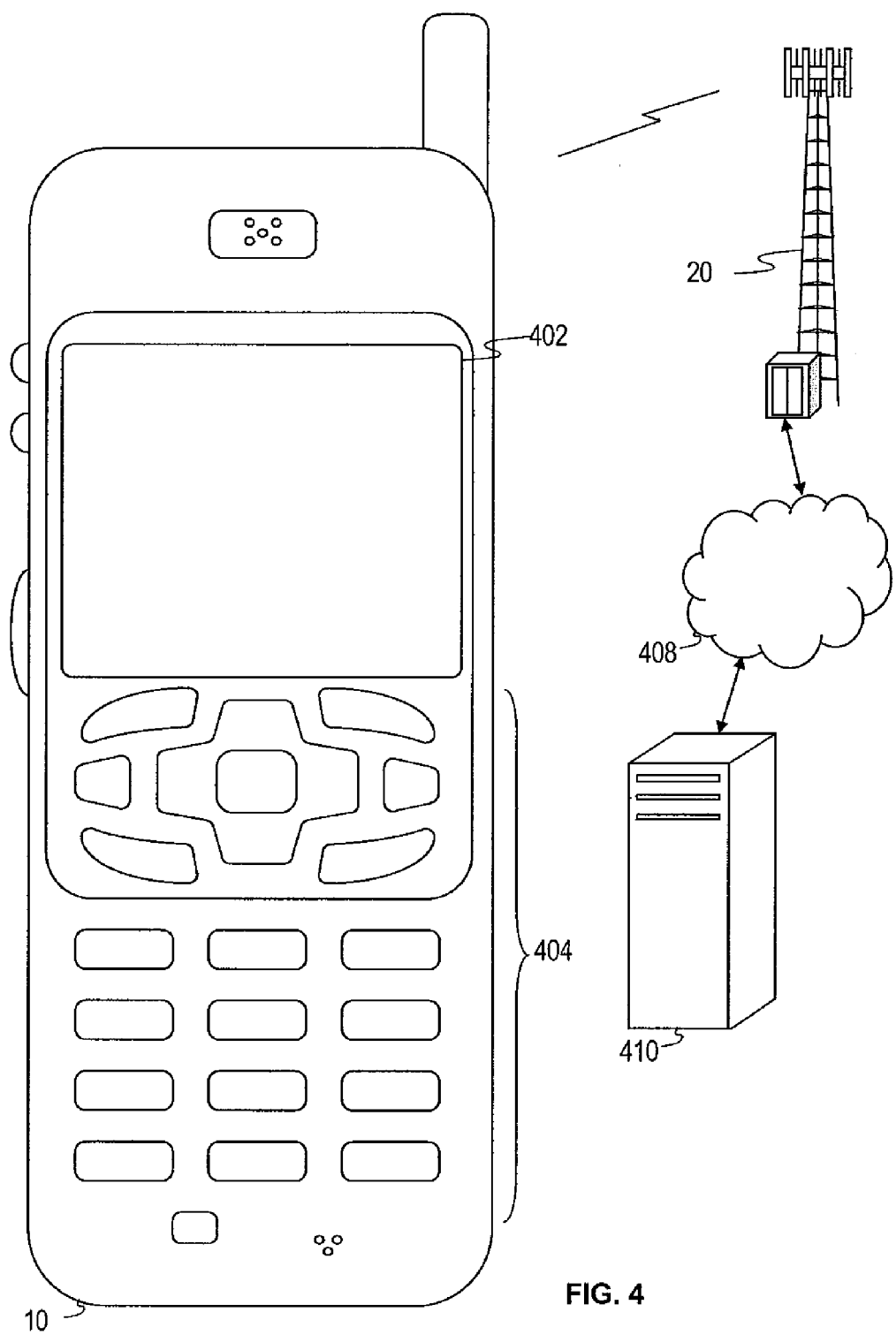
FIG. 4 is a diagram of a wireless communications system including a UE operable for some of the various embodiments of the disclosure.

FIG. 4 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on. The UE 10 may be a dual or multi-mode or multi-domain device operable to access various networks and systems including e-UTRAN, and other radio access technologies (RAT) such as GERAN, UTRAN, WiMAX, CDMA 2000, WLAN, and others that will readily suggest themselves to one skilled in the art. The UE 10 in the present embodiment, supports UTRAN services including multiple mode, single or dual mode radio, multiple packet data network (PDN) connectivity support, IP protocol support such as MIPv4, MIPv6, multiple radio access network (RAN) cell measurement, and so on, such as those specific to UTRAN UE including after developed functionality.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 11 and UE 12.

Among the various applications executable by the UE 10 are a web browser, which enables the display 402 to show a web page. The web page may be obtained via wireless communications with a node B 20 which may comprise one of a wireless network access node, a cell tower, a peer UE 11 or UE 12, or any other wireless communication network. The node B 20 is coupled to a wired network 408, such as the Internet. Via the wireless link and the wired network, the UE 10 has access to information on various servers, such as a server 410. The server 410 may provide content that may be shown on the display 402. Alternately, the UE 10 may access the node B 20 through a peer UE 11 and UE 12 acting as an intermediary, in a relay type or hop type of connection.

Figure 5:
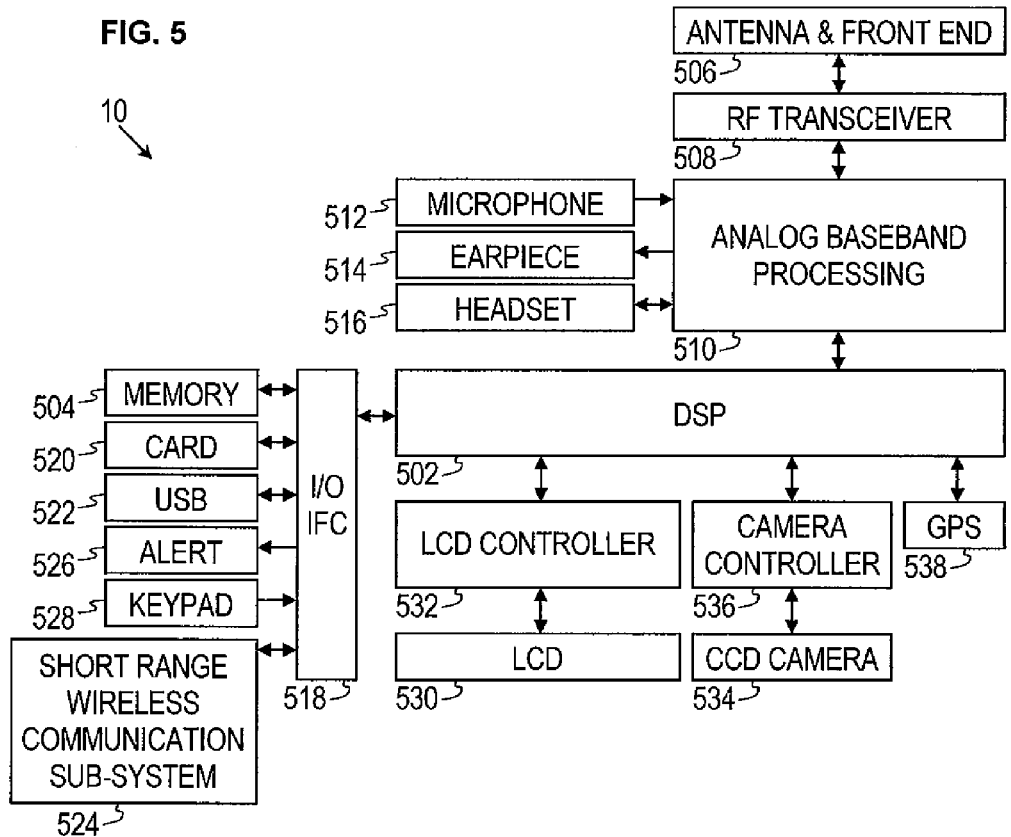
FIG. 5 is a block diagram of a UE operable for some of the various embodiments of the disclosure.

FIG. 5 shows a block diagram of the UE 10. While a variety of known components of wireless devices of which the UE 10 is an instance are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 11 or UE 12. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 6:
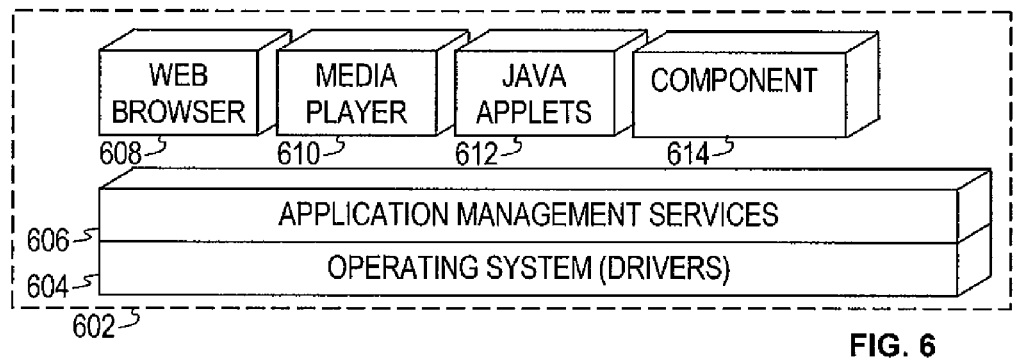
FIG. 6 is a diagram of a software environment that may be implemented on a UE operable for some of the various embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 6 are a web browser application 608, a media player application 610, Java applets 612, and a component 614. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to cell selection as described in the method for servicing cell discovery during out-of-service as described herein. Although the component 614 is shown in FIG. 6 at an application software level, the component 614 may be implemented at a lower system level than is illustrated in FIG. 6.

The node B 20, the central control 110, and other components that might be associated with the cells 102 may include any general-purpose computer with sufficient processing power, memory resources, and network throughput capability to handle the necessary workload placed upon it.

Figure 7:
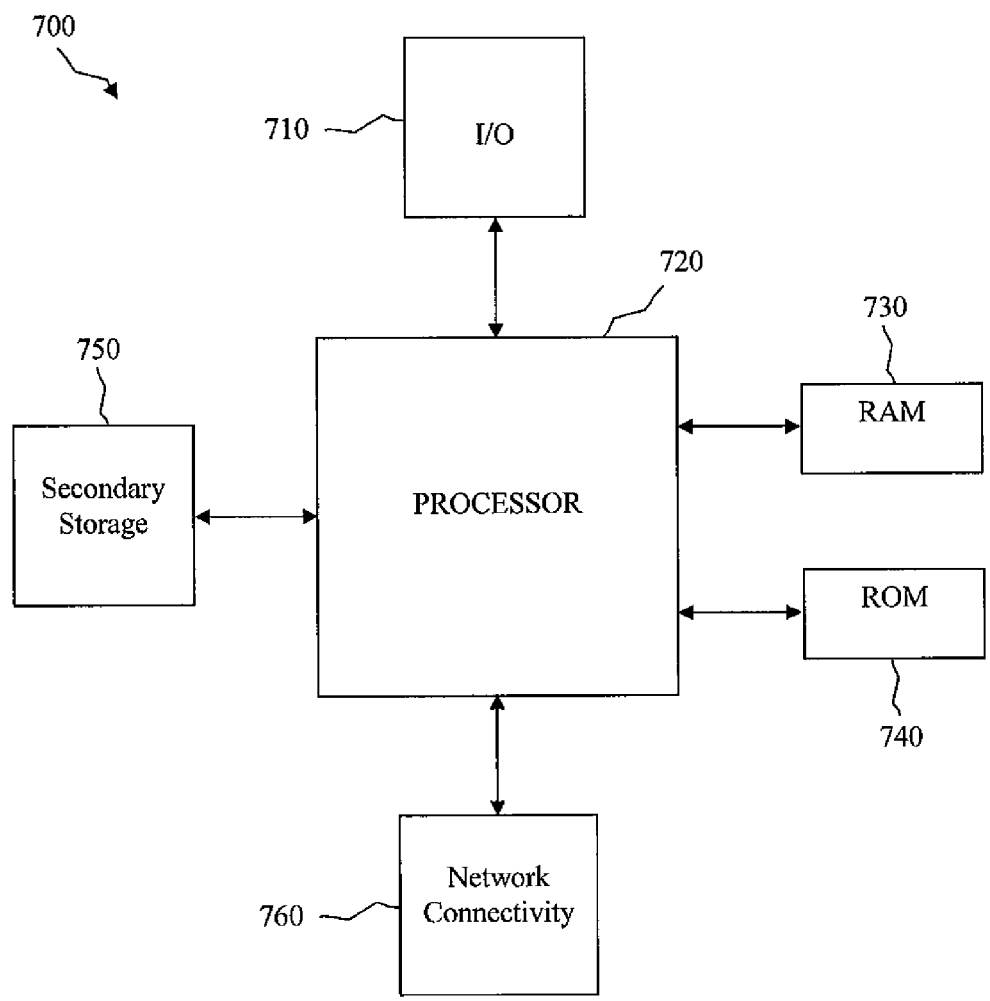
FIG. 7 is an illustrative general purpose computer system suitable for some of the various embodiments of the disclosure.

FIG. 7 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. The ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with the Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk based systems may all be considered secondary storage 750), ROM 740, RAM 730, or the network connectivity devices 760.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
a component comprising a timer, the component so configured that, when the UE loses coverage from a first cell operated as part of a registered public land mobile network (RPLMN), the component searches for a suitable cell before the UE loses a connection to a network, the timer being selected from one or more timers and configured to start when the UE loses coverage, the one or more timers including at least one of an out of service timer or a T307 timer,
wherein the component searches for the suitable cell by:
making a first check in time of the first cell;
making a first check of other cells provided by the RPLMN;
subsequent in time to the first check of the other cells, making a second check in time of the first cell; and
subsequent in time to the second check of the first cell, making a further cell check;
wherein making the first check of the other cells comprises
(a) checking for coverage from at least one of a cell on the same frequency as the first cell, and a cell on one of a plurality of frequencies supported by the RPLMN; and
(b) checking for coverage from at least one of a cell using a radio access technology (RAT) supported by the RPLMN, and a serving cell other than the first cell using a RAT supported by the RPLMN and different from the RAT used just prior to losing coverage;
wherein the component is further configured to make the first check of the other cells by checking for coverage from a neighbor cell of the first cell about twenty-five seconds before the out of service timer or the T307 timer expires and about fifteen seconds before the out of service timer or the T307 timer expires.

2. The UE of claim 1, wherein the component makes the second check of the first cell about three to about seven seconds after the first check on the first cell.

3. The UE of claim 1, wherein the one or more timers comprise the out of service timer, a T314 timer, a T315 timer and the T307 timer, and the component is further configured to make the second check for the first cell before the out of service timer, the T314 timer, the T315 timer or the T307 timer expires.

4. The UE of claim 3, wherein the component is further configured to make the first check of the other cells about three to about seven seconds before the out of service timer, the T314 timer, the T315 timer or the T307 timer expires.

5. The UE of claim 3, wherein the component is further configured to make the further cell check before the out of service timer, the T314 timer, the T315 timer or the T307 timer expires.

6. The UE of claim 1, wherein the component is configured to make the further cell check by checking for coverage from cells proximate to the first cell periodically before the UE enters idle mode.

7. The UE of claim 1, wherein making the further cell check comprises checking for coverage from at least one of:
a neighbor cell of the first cell,
a cell provided by a PLMN other than the RPLMN, and a cell other than the first cell that is on the same frequency as the first cell.

8. The UE of claim 1, wherein making the further cell check comprises checking for coverage from a cell adjacent to the first cell.

9. A method of discovering a serving cell, comprising:
   detecting a loss of coverage from a first cell;
   starting an out of service timer upon detecting the loss of coverage from the first cell operated as part of a registered public land mobile network (PLMN);
   starting a T307 timer; and
   searching for a suitable cell prior to losing a connection to a network, wherein searching for the suitable cell comprises:
      making a first check in time of the first cell;
      making a first check of other cells provided by the registered PLMN;
      subsequent in time to the first check of the other cells, making a second check in time of the first cell; and
      subsequent in time to the second check of the first cell, making a further cell check;
   wherein making the first check of the other cells comprises (a) checking for coverage from at least one of a cell on the same frequency as the first cell, and a cell on one of a plurality of frequencies supported by the registered PLMN; and (b) checking for coverage from at least one of a cell using a radio access technology (RAT) supported by the registered PLMN, and a serving cell other than the first cell using a RAT supported by the registered PLMN and different from the RAT used just prior to detecting loss of coverage;
   wherein making the first check of the other cells further comprises checking for coverage from a neighbor cell of the first cell about twenty-five seconds before the out of service timer or the T307 timer expires and about fifteen seconds before the out of service timer or the T307 timer expires.

10. The method of claim 9, wherein making the first check of the other cells is further restricted to checking for coverage from a cell adjacent to the first cell.

11. The method of claim 9, further including making the second check of the first cell before expiration of the out of service timer.

12. The method of claim 9, wherein making the further cell check includes checking for coverage from a cell using a radio access technology (RAT) supported by the registered PLMN.

13. The method of claim 9, further comprising making the second check of the first cell about three to about seven seconds after making the first check of the first cell.

14. The method of claim 9, further including:
   prior to expiration of the T307 timer, making the further cell check by checking for coverage from a cell proximate to the first cell.

15. The method of claim 9, further including:
   starting one of a T314 timer and a T315 timer; and
   prior to expiration of the one of the T314 timer and the T315 timer, making the second check of the first cell.

16. A user equipment (UE), comprising:
   a component comprising a timer, the component so configured that, when the UE loses coverage from a first cell, the component searches for a suitable cell before the timer expires and before losing a connection to a network, the timer being selected from one or more timers and configured to start when the UE loses coverage, the one or more timers including at least one of an out of service timer or a T307 timer,
   wherein the component searches for the suitable cell by:
      making a first check in time of the first cell;
      making a first check of cells proximate to the first cell; and
      subsequent in time to the first check of the other cells, making a second check in time of the first cell;
   wherein making the first check of the other cells comprises (a) checking for coverage from at least one of a cell on the same frequency as the first cell, and a cell on one of a plurality of frequencies supported by the RPLMN; and (b) checking for coverage from at least one of a cell using a radio access technology (RAT) supported by the RPLMN, and a serving cell other than the first cell using a RAT supported by the RPLMN and different from the RAT used just prior to losing coverage;
   wherein the component is further configured to make the first check of the other cells by checking for coverage from a neighbor cell of the first cell about twenty-five seconds before the out of service timer or the T307 timer expires and about fifteen seconds before the out of service timer or the T307 timer expires.

* * * * *